July 13, 1954 H. K. BLANNING 2,683,427
FLOOR RACK FOR TRANSPORTATION EQUIPMENT
Filed Dec. 30, 1948 11 Sheets-Sheet 4
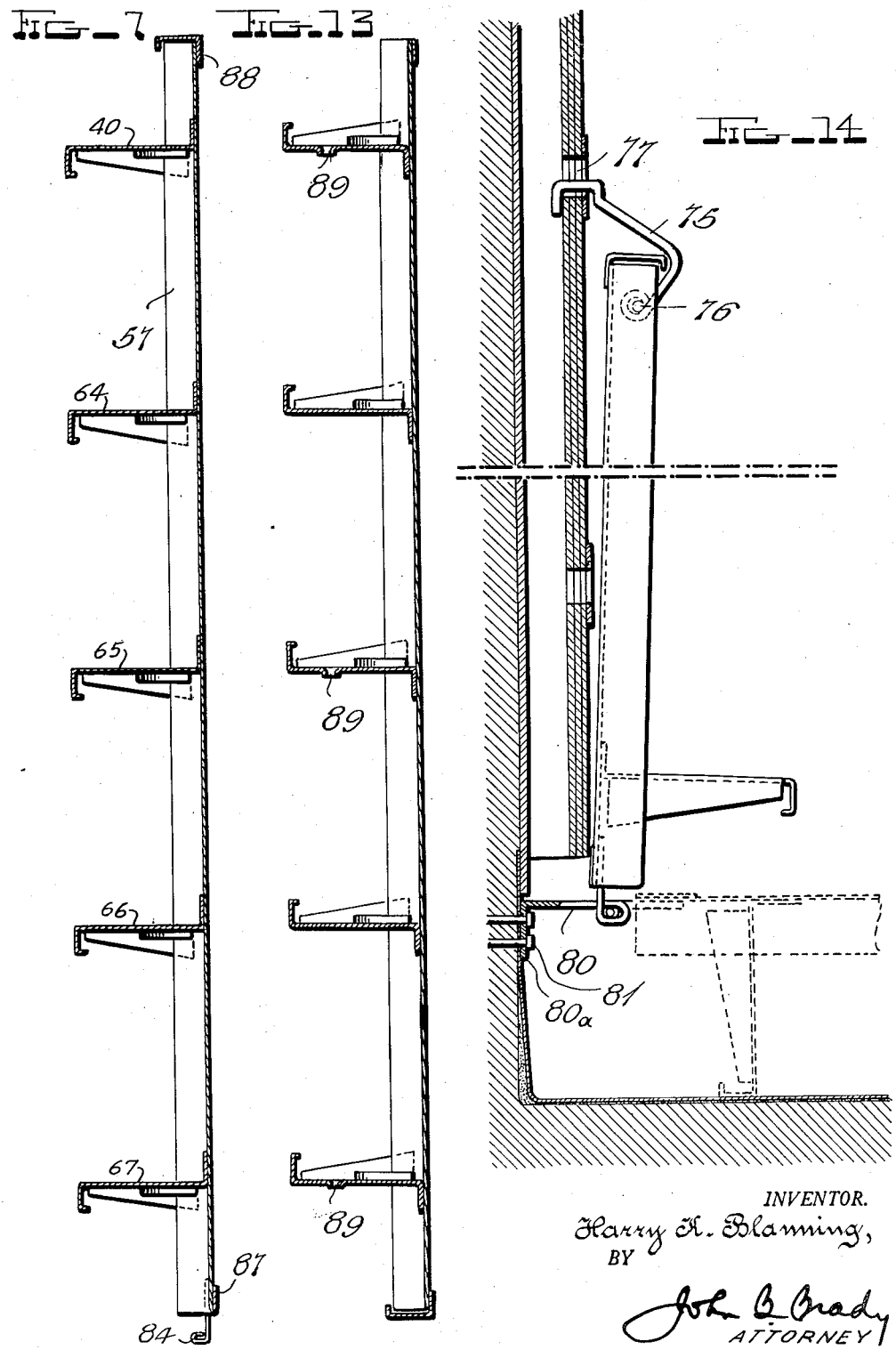
INVENTOR.
Harry K. Blanning,
BY
John C. Brady
ATTORNEY July 13, 1954     H. K. BLANNING     2,683,427
FLOOR RACK FOR TRANSPORTATION EQUIPMENT
Filed Dec. 30, 1948     11 Sheets-Sheet 5
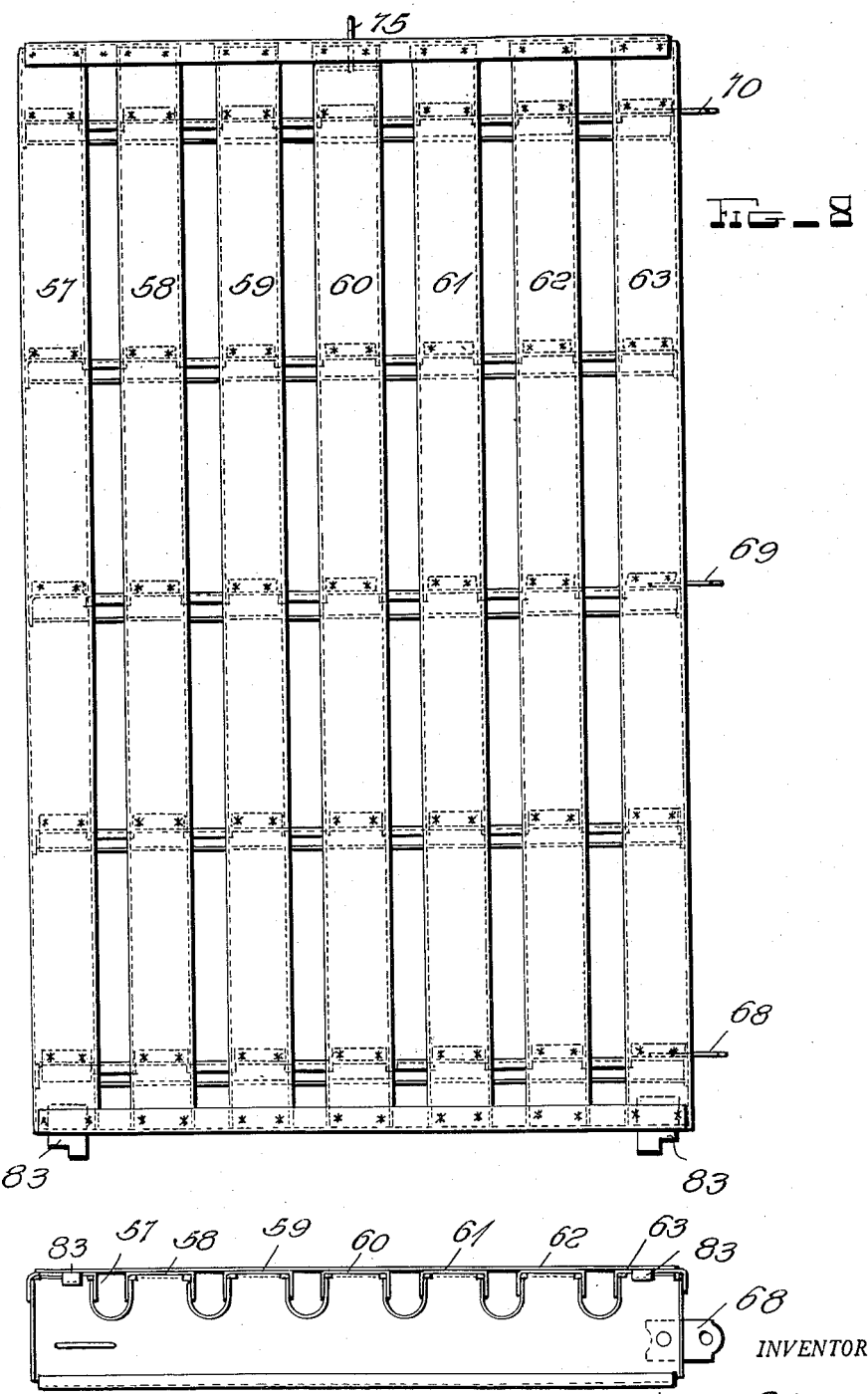
INVENTOR.
BY Harry K. Blanning,
John B. Grady
ATTORNEY

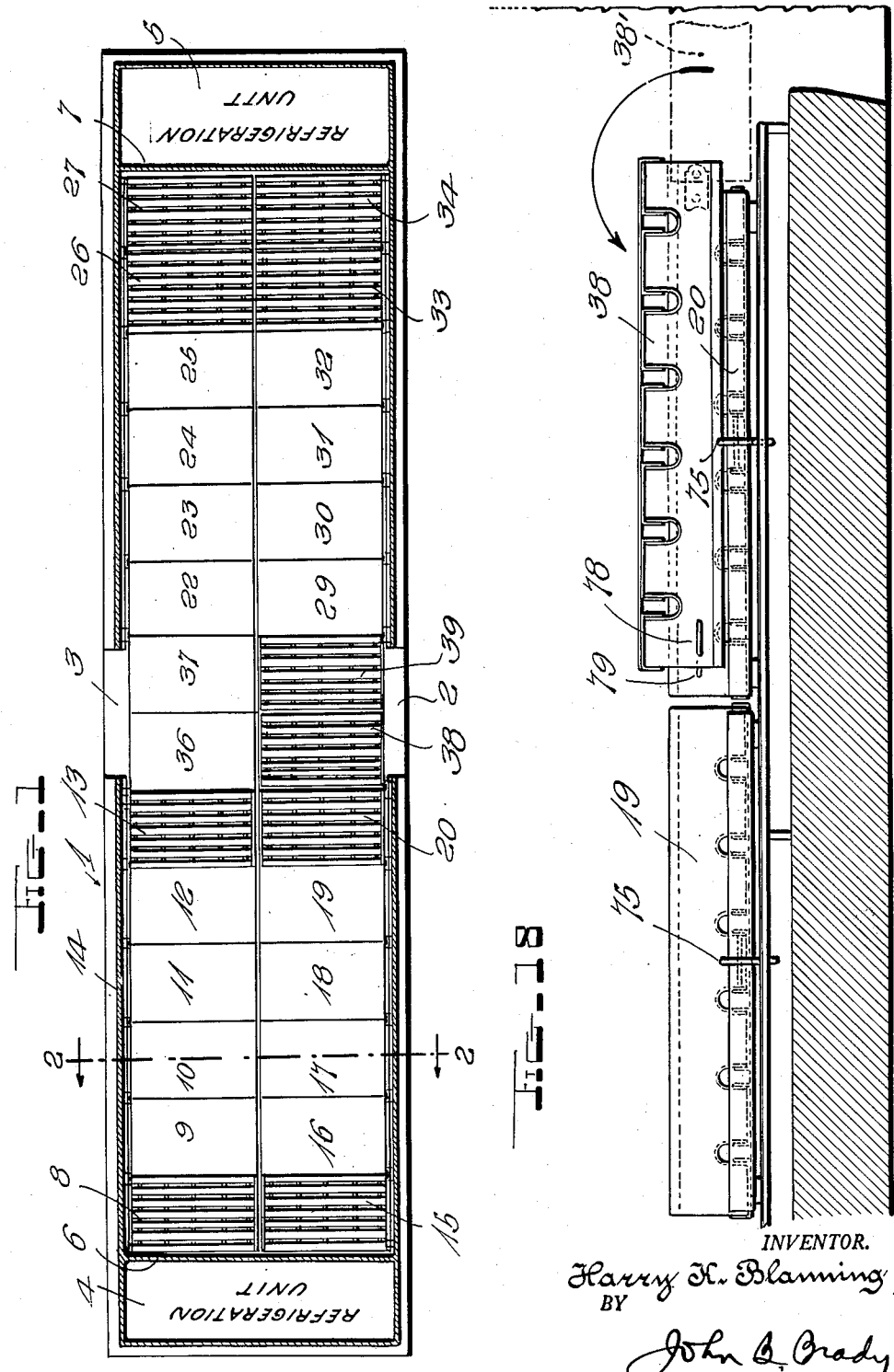

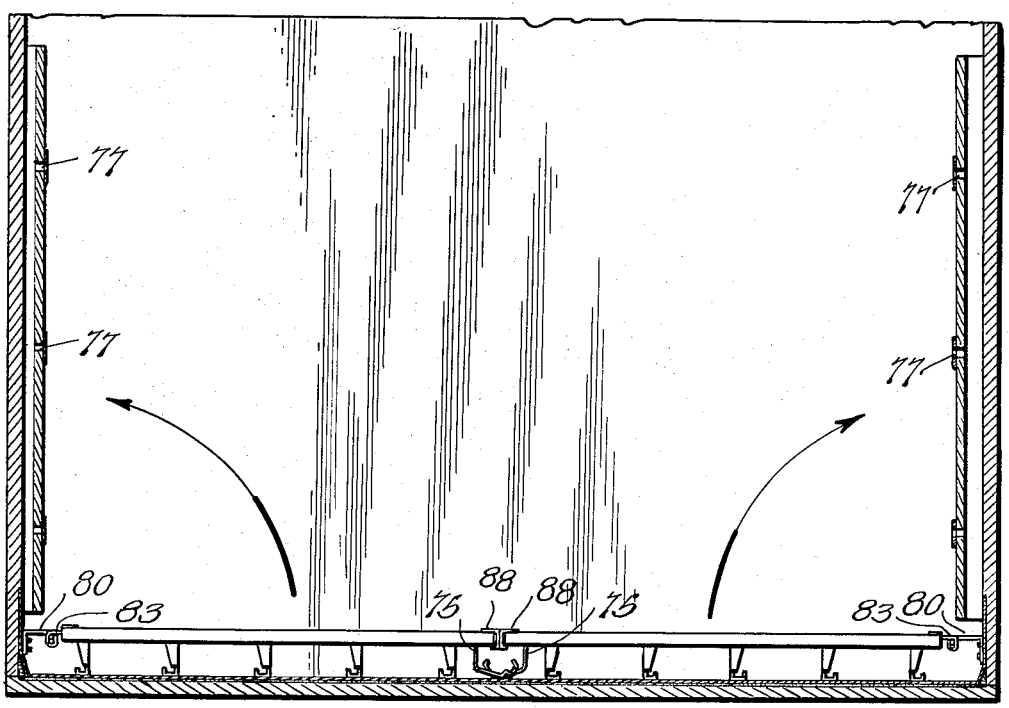
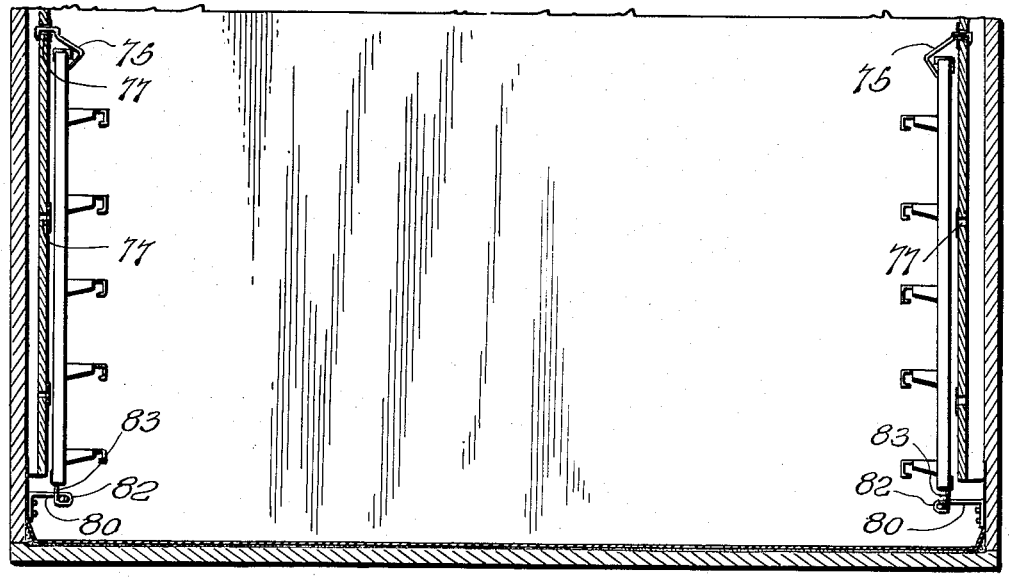

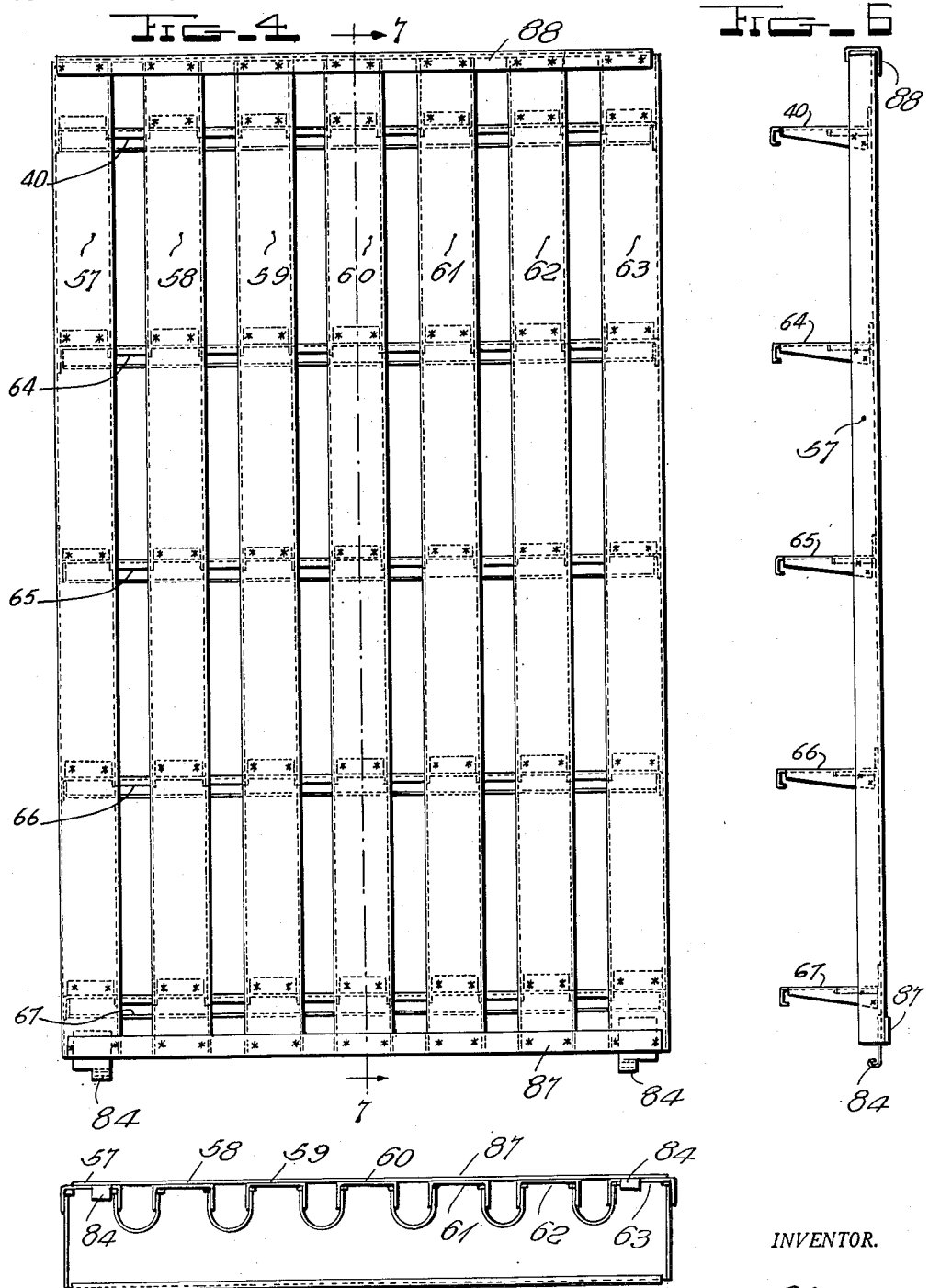

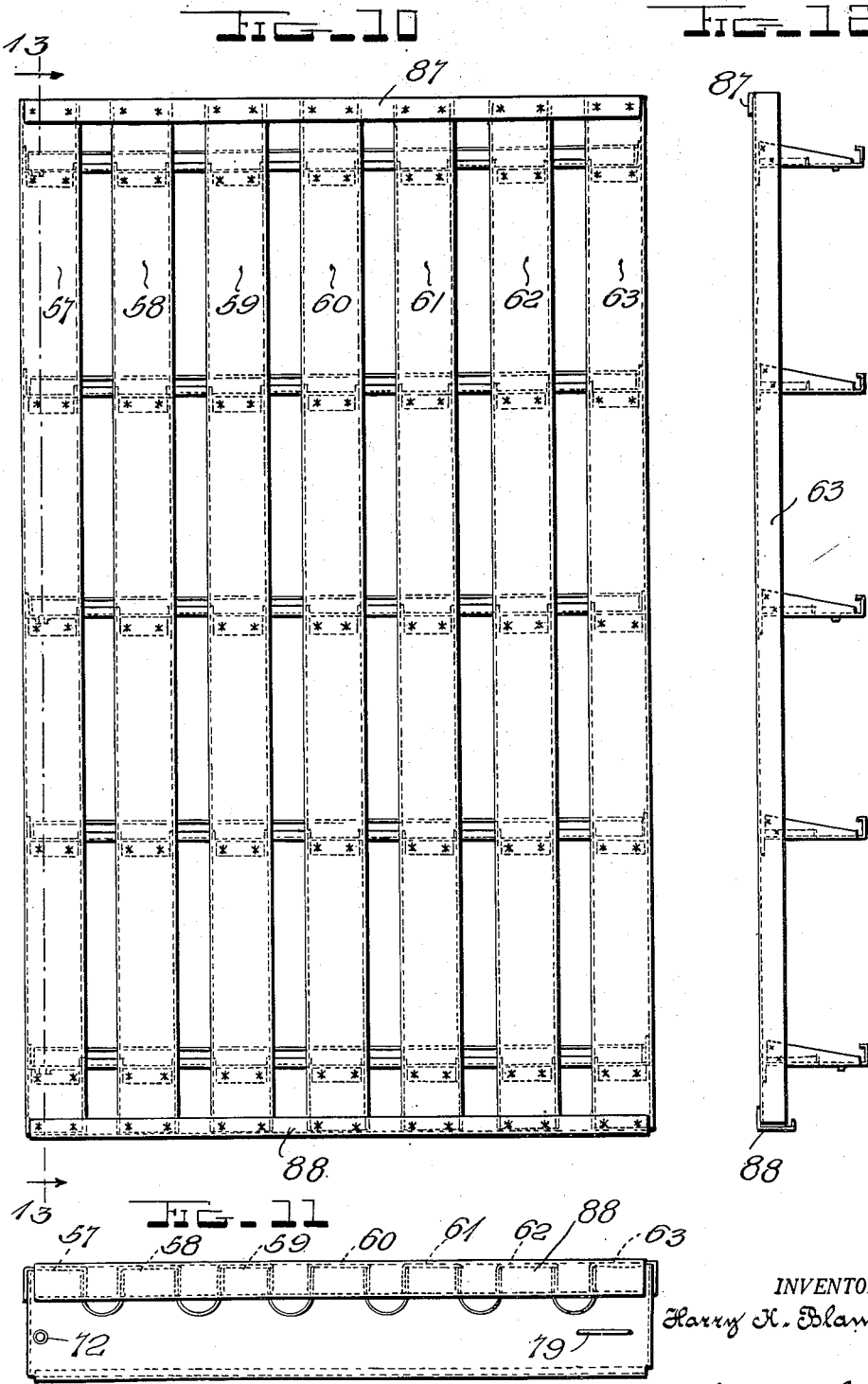

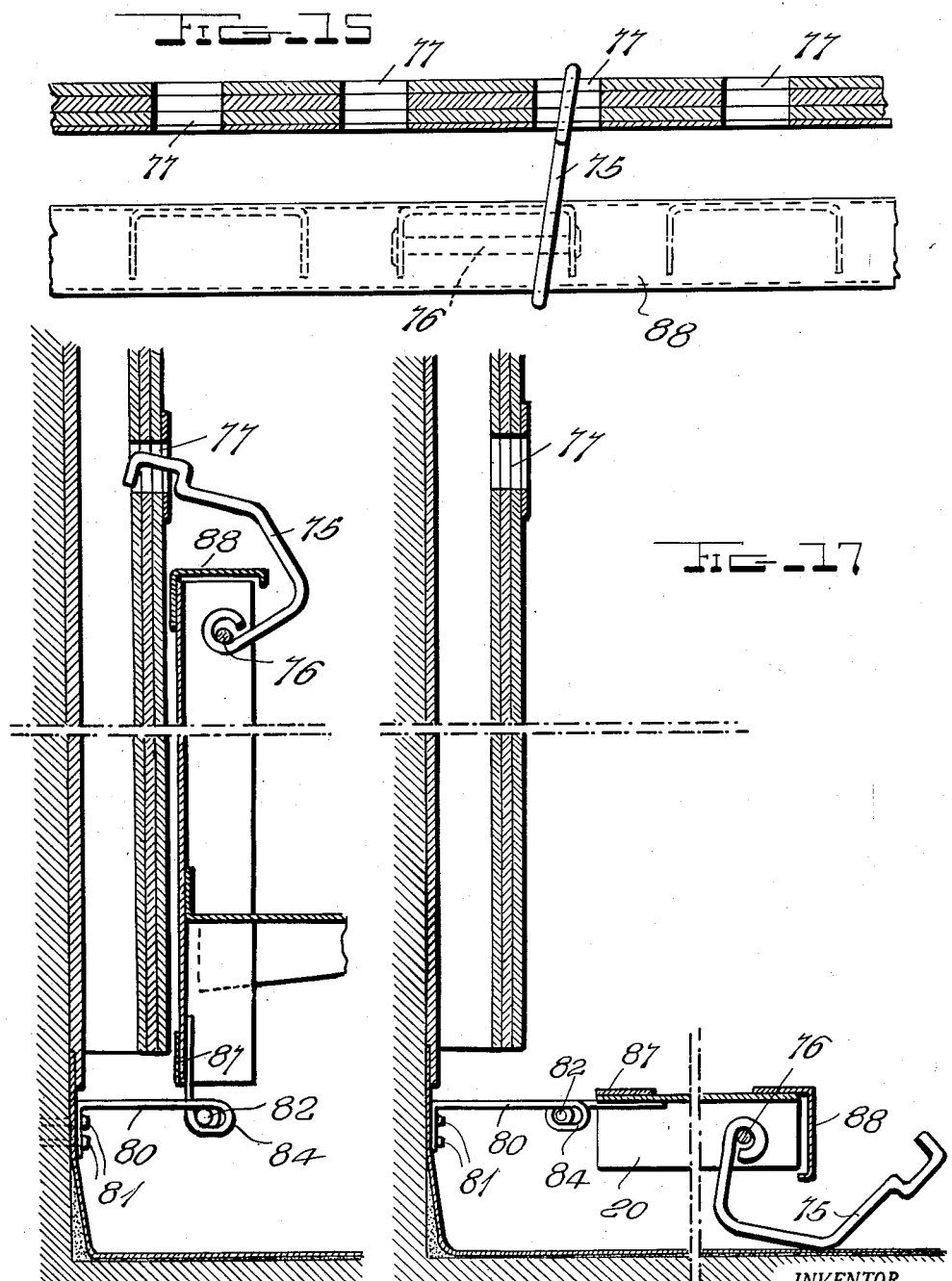

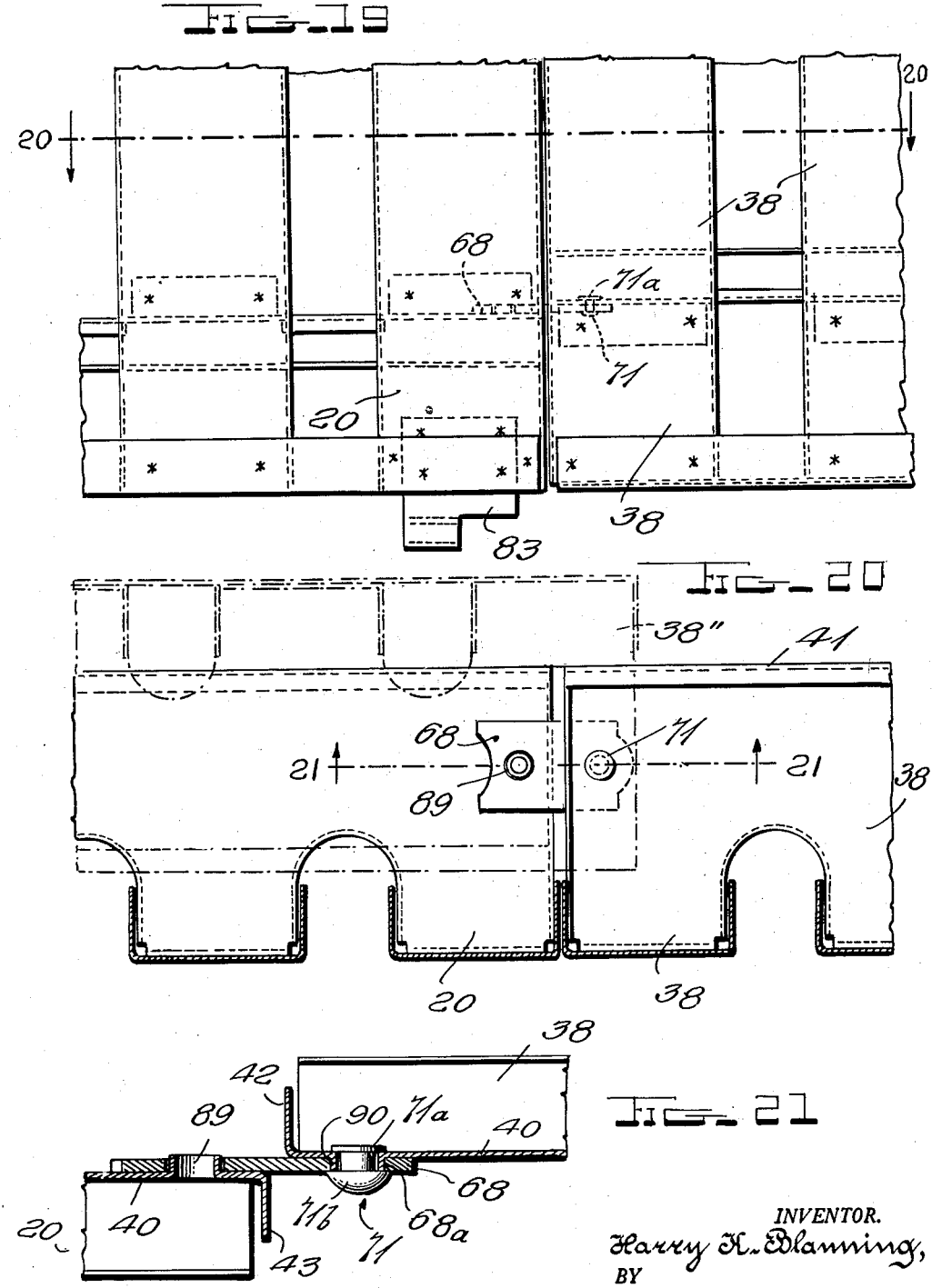

July 13, 1954 H. K. BLANNING 2,683,427
FLOOR RACK FOR TRANSPORTATION EQUIPMENT
Filed Dec. 30, 1948 11 Sheets-Sheet 9
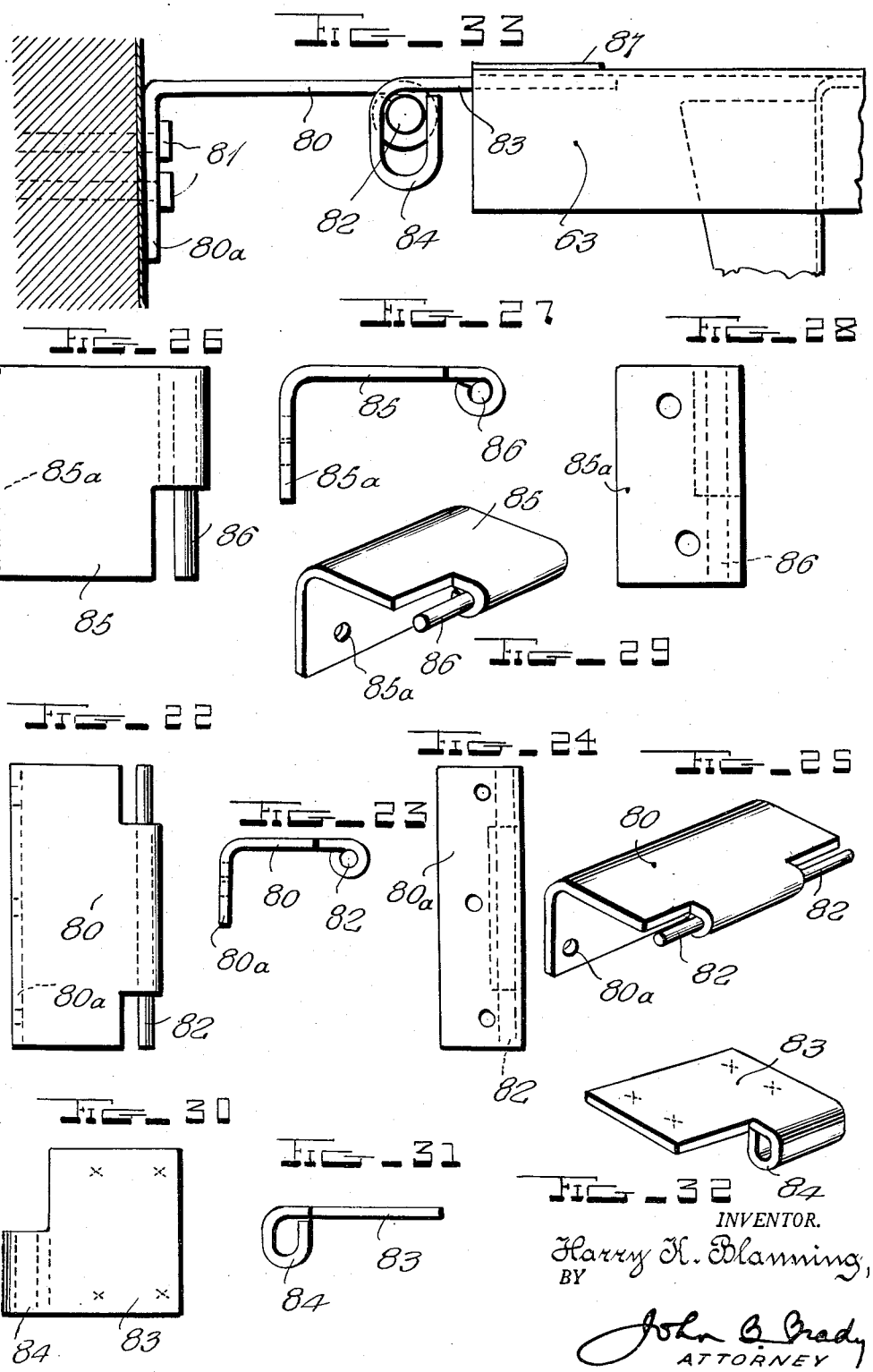
INVENTOR.
Harry K. Blanning,
BY
John B. Brady
ATTORNEY

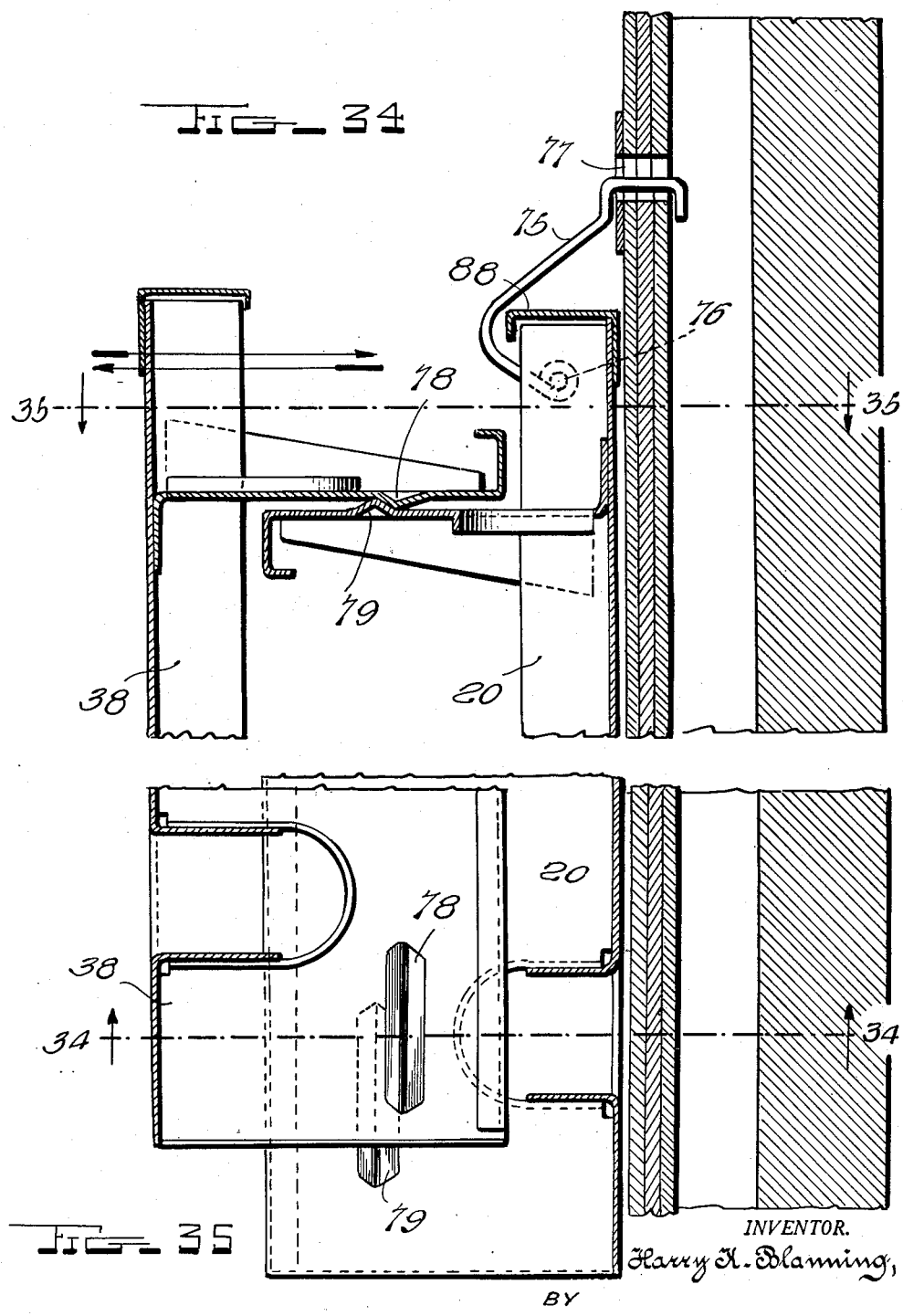

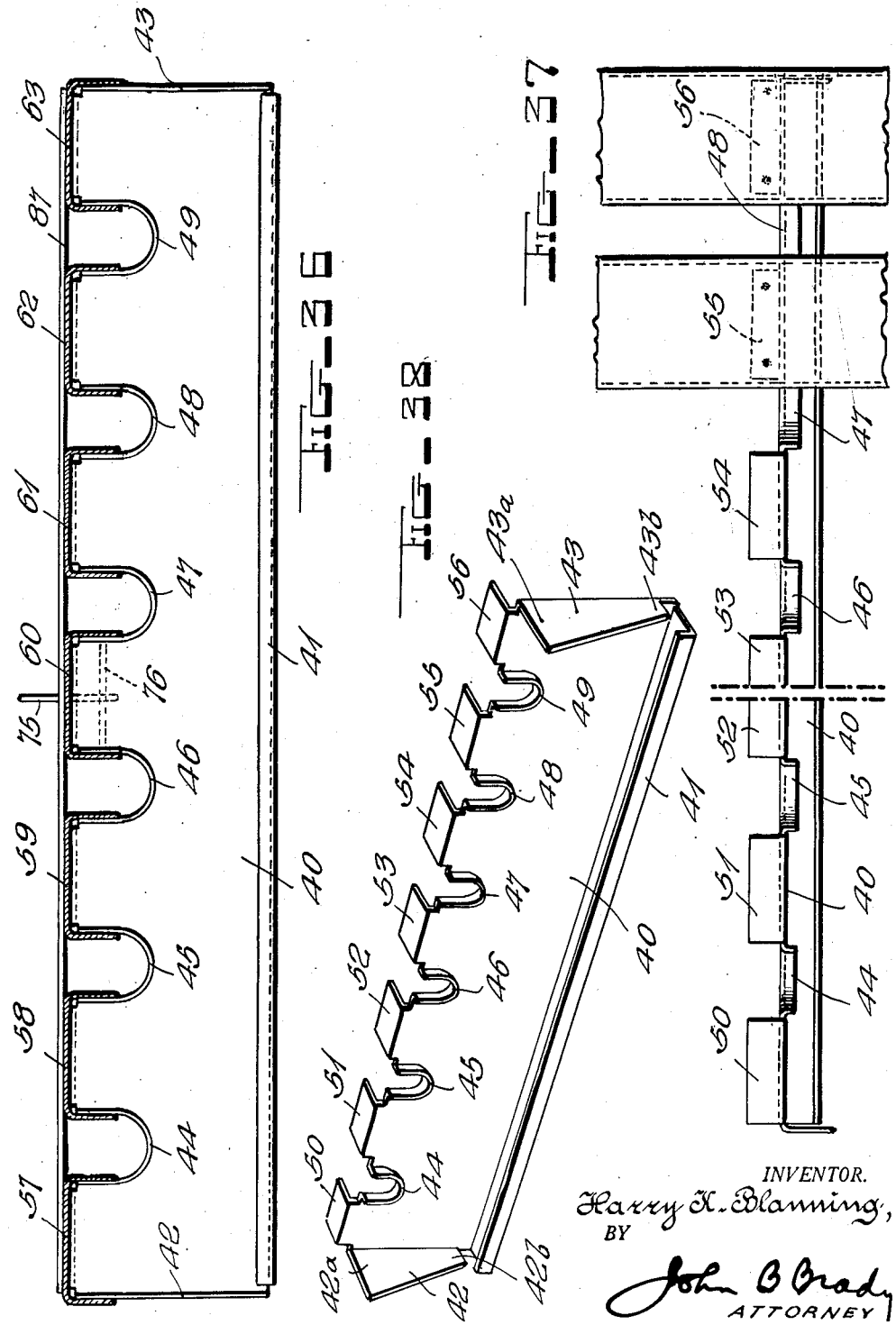

Patented July 13, 1954

2,683,427

UNITED STATES PATENT OFFICE 2,683,427

FLOOR RACK FOR TRANSPORTATION EQUIPMENT

Harry K. Blanning, Chicago, Ill., assignor, by mesne assignments, to International Steel Company, Evansville, Ind., a corporation of Indiana Application December 30, 1948, Serial No. 68,360

6 Claims. (Cl. 105—375)

My invention relates broadly to transportation equipment and more particularly to a floor rack structure for transportation equipment.

One of the objects of my invention is to provide an improved sanitary floor rack for transportation equipment.

Another object of my invention is to provide a construction of floor rack for transportation equipment which is arranged in sections and hingedly connected with the interior side walls of the transportation unit and which may be lowered into coplanar relation for providing a supporting surface for cargo and perishable food products within the transportation unit.

Still another object of my invention is to provide a floor rack structure for transportation units composed of a plurality of coacting foldable racks certain of which are adapted to nest with respect to each other and to be hingedly moved to a stowed position within the transportation unit.

Still another object of my invention is to provide a construction of sectionalized floor rack for transportation units wherein the sections of the floor rack are formed from stainless steel fabricated into racks hingedly connected with the walls of the transportation unit and adapted to be raised for washing the floor structure and lowered for supporting the cargo and perishable food rack products, each of the sections being readily washable under the action of a forced flow of water, or of steam, for ensuring a sanitary condition in the transportation unit.

Other and further objects of my invention reside in floor construction of the racks for a transportation unit and the means for hingedly connecting the racks with the walls of the transportation unit or with each other, as set forth more fully in the specification hereinafter following by reference to the accompanying drawings in which:

Fig. 1 is a plan view showing the application of the floor rack of my invention to a refrigerator car; Fig. 2 is a transverse sectional view taken substantially on line 2—2 of Fig. 1, and showing two coacting racks lowered in position; Fig. 3 is a view similar to Fig. 2 but showing the racks raised against opposite sides of the refrigerator car for washing down the floor; Fig. 4 is a top plan view of one of the racks employed in the transportation unit; Fig. 5 is an end view of the rack shown in Fig. 4; Fig. 6 is a side elevational view of the rack illustrated in Fig. 4; Fig. 7 is a longitudinal sectional view of the rack illustrated in Figs. 4, 5, and 6, the view being taken substantially on line 7—7 of Fig. 4; Fig. 8 is a top plan view of one of the racks adjacent the central door of the transportation unit; Fig. 9 is an end view of the rack shown in Fig. 8; Fig. 10 is a top plan view of one of the racks directly aligned with the door of the transportation unit and hingedly connected with the rack illustrated in Fig. 8; Fig. 11 is an end view of the rack shown in Fig. 10; Fig. 12 is a side elevational view of the rack shown in Figs. 10 and 11; Fig. 13 is a longitudinal sectional view of the rack shown in Figs. 10, 11 and 12, the view being taken substantially on line 13—13 of Fig. 10; Fig. 14 is an enlarged fragmentary end view of one of the rack sections illustrating the manner of hingedly connecting the section with the side wall of the refrigerator car; Fig. 15 is a fragmentary detailed view showing the manner of hooking the rack into raised position adjacent the side wall of the refrigerator car as illustrated in Fig. 14; Fig. 16 is a detailed view showing the position of the rack section in normal hanging position; Fig. 17 is a detailed view showing the position of the rack in horizontal position for supporting the cargo or perishable food products; Fig. 18 is a horizontal sectional view showing the coacting sections of the floor racks in vertical position and hooked to the side walls of the refrigerator car and particularly illustrating the manner of nesting the racks adjacent the side door opening of the refrigerator car unit; Fig. 19 is an enlarged fragmentary plan view showing the manner of inter-connecting the racks adjacent the side opening of the transportation unit; Fig. 20 is an enlarged fragmentary sectional view on line 20—20 of the racks illustrated in Fig. 19; Fig. 21 is a detailed view of the rack hinge for connecting the rack sections adjacent the side wall opening of the transportation unit; Fig. 22 is a plan view of one of the hinge members used between the rack sections constituting the major area of the floor; Fig. 23 is an end view of the hinge shown in Fig. 22; Fig. 24 is a side view of the hinge shown in Figs. 22 and 23; Fig. 25 is a perspective view of the hinge illustrated in Figs. 22, 23 and 24; Fig. 26 is a plan view of one of the hinges employed for connecting the rack section immediately adjacent the central opening of the car with the wall of the car; Fig. 27 is an end view of the hinge shown in Fig. 26; Fig. 28 is a side view of the hinge shown in Figs. 26 and 27; Fig. 29 is a perspective view of the hinge section illustrated in Figs. 26, 27 and 28; Fig. 30 is a plan view of the hinge section carried by the rack which occupies the open door area of the refrigerator car and which coacts with the hinge section illustrated in Figs. 26–29 and which also constitutes the hinge section carried by the intermediate rack coacting with the hinge section of Figs. 22–25; Fig. 31 is an end elevational view of the hinge section illustrated in Fig. 30; Fig. 32 is a perspective view of the hinge section shown in Figs. 30 and 31; Fig. 33 is a fragmentary side elevational view showing the assembly of the hinge sections which connect the racks with the side wall of the transportation unit; Fig. 34 is an enlarged fragmentary vertical sectional view showing the nesting of the rack sections adjacent the doorway of the transportation unit and the manner of maintaining the rack sections which fold into the doorway area from a nested vertical position; Fig. 35 is a fragmentary transverse sectional view taken on line 34—34 of Fig. 33 and illustrating the nested position of the rack sections on an enlarged scale similar to the showing illustrated in Fig. 18; Fig. 36 is an enlarged transverse sectional view through one of the racks and showing the arched construction thereof for imparting strength to the rack; Fig. 37 is a fragmentary top plan view of one of the transverse supports for the racks and showing fragmentary portions of two of the metallic stringers supported by the racks; and Fig. 38 is a perspective view of one of the transverse supports for the racks.

My invention is directed to a sanitary metallic floor rack structure for transportation units and is particularly designed for installation in refrigerator cars for transportation of meats, vegetable, fruits and other perishable food products. While I have illustrated my invention as applied to a refrigerator car, I desire it to be understood that the floor rack structure is equally applicable to trucks and other units where the sanitary preservation of food products is important. Accordingly, throughout the specification wherever reference is made to refrigerator cars I desire that it be understood that the structure is equally applicable to all forms of transportation units and to storage units where a sanitary protective flooring is employed. The racks of my invention are fabricated from stainless steel and have been developed to support very substantial loads. The racks have a high degree of rigidity and yet the racks are light in weight and may be readily elevated from a horizontal load-supporting position to a stowed position at the sides of the transportation unit for washing the floor beneath the racks and for washing the racks under forced flow of water or steam. At the end of each transportation run the racks and the interior of the transportation unit are subject to a thorough cleaning operation preparatory to receiving a further shipment.

The construction of a refrigerator car is such that it is not possible to employ the same type of rack throughout the entire car. This is due to the center door opening in the refrigerator car for loading and unloading the cargo. The rack sections which are effective within the interior of the refrigerator car are hinged to the opposite interior side walls of the car, but at the open door positions of the car there are no side walls with which to establish hinge connections between the racks and the car. Accordingly, four rack sections are provided at the central door position and constructed to symmetrically cover the central door position. Individual rack sections at the central door position are hingedly connected with adjacent rack sections which in turn hingedly connect with the interior side walls of the refrigerator car. The two rack sections may thus be nested with respect to each other and angularly moved to a stowed position against the wall of the refrigerator car. Four such nesting units are provided in the average refrigerator car installation whereas there are generally twenty rack sections which hingedly connect with the interior walls of the refrigerator car and are angularly movable to stowed position therein but which did not involve the nesting feature which I have found necessary to provide at the central door location of the refrigerator car.

Referring to the drawings in detail, reference character 1 designates a conventional refrigerator car having side openings 2 and 3 normally closed by refrigerator doors. The car is represented as having space for refrigeration units at each end thereof as indicated at 4 and 5 separate from the interior or loading-receiving portion of the car by partitions 6 and 7.

The interior of the refrigerator car is covered by a metallic flooring which may be readily cleaned to maintain the interior of the car sanitary at all times. The opposite end portions of the refrigerator car is equipped with the supporting racks of my invention arranged in sections which I have designated at 8, 9, 10, 11, 12 and 13, all hinged to the wall 14 of the refrigerator car and coacting sections 15, 16, 17, 18, 19 and 20 all hingedly connected with the opposite side of wall 21 of the refrigerator car. Similarly, the other end of the refrigerator car is provided with rack sections 22, 23, 24, 25, 26 and 27, hingedly connected with the side wall 28 of the refrigerator car and aligned with coacting rack sections 29, 30, 31, 32, 33 and 34, hingedly connected with side wall 35 of the refrigerator car. Rack sections 8—12 and 15—19 and 23—27 and 30—34 are all symmetrical and are shown more clearly in Figs. 4–7. Rack sections 13, 20, 22 and 29 are symmetrical and are constructed as shown more clearly in Figs. 8 and 9. These rack sections are all arranged interiorly of the refrigerator car. However, it is essential to provide rack sections through the central door positions at 2 and 3 where there is no opportunity of hingedly connecting these rack sections to the side walls of the car. I have shown these particular rack sections at 36, 37, 38 and 39. The structure of the sections 36—39 is illustrated more clearly in Figs. 10 to 13.

Each rack includes a plurality of transversely extending stringers represented at 40 in Figs. 36–38. Each stringer is provided with a laterally disposed longitudinally extending channel portion 41 forming a supporting foot at the bottom thereof and is provided with a transversely disposed strengthening flange 42 and 43 at each end thereof tapering from a relatively wide dimension 42a and 43a at the top thereof to a relatively narrow dimension 42b and 43b adjacent the bottom thereof. The stringer 40 is provided with arch-shaped cut-outs adjacent the top thereof and these cut-outs are each outstruck in the same direction to provide arched flanges 44, 45, 46, 47, 48, and 49 for imparting strength and rigidity to the stringer 40. Intermediate the arch-shaped cut-outs the stringer 40 is provided with integrally connected tongues 50, 51, 52, 53, 54, 55 and 56 extending in a plane normal to the plane of stringer 40. These tongues 50—56 extend in a direction opposite to the direction in which the arch-shaped flanges 44—49 extend, thereby providing a light-weight structural unit of very substantial rigidity. The tongues 50—56 are each narrowed sufficiently to enable the tongues and the side portions of the arch-shaped flanged cut-outs 44—49 to be wiped by the channel-shaped stringers which I have designated at 57, 58, 59, 60, 61, 62, and 63 in Figs. 4–13. Although there are three different types of rack sections as I have heretofore explained, for purposes of simplification I have indicated the stringers for all of the racks by the same reference characters. Each rack includes five laterally disposed stringers corresponding to stringer 40 in Fig. 38 and I have indicated these stringers in Figs. 6–13 by reference characters 40, 64, 65, 66, and 67, arranged at symmetrically spaced intervals beneath the racks.

In Fig. 2 I have shown the rack sections in operative position for carrying the load within the refrigerator car. In Fig. 3 I have shown the manner in which the racks are hinged upwardly and stowed against the side walls of the car.

Fig. 18 illustrates more clearly the manner in which rack 38 in the central door position of the car is nested into rack 20 immediately adjacent the central door position of the car. This is accomplished by providing rack 20 as shown in Figs. 8 and 9 with laterally extending bars 68, 69 and 70 attached to the plane surface thereof adjacent the bottom of the plate. These bars serve as hinged members as represented more clearly in Fig. 21 by establishing connection with a pin 71 passing through aperture 72 as indicated in Fig. 11 in the aligned stringer 40 in the rack section 38 illustrated in Figs. 10–13. Similarly, bar 69 establishes pivoted connection with a pin extending through aperture 73 in stringer 65 of rack section 38, and similarly, bar 70 establishes pivotal connection with a pin passing through aperture 74 in stringer 67 on rack section 38. Accordingly, rack section 38 may be swung to a position with respect to rack section 20 in which rack section 38 is nested with respect to rack section 20 as shown in Fig. 18. The nested sections may then be moved to a position in which both nested sections are stowed against the side wall of the car. This is accomplished by means of a hook 75 shown more clearly in Figs. 15 and 16. Hook 75 is carried by laterally disposed pin 76 in channel-shaped stringer 60 by which the hook 75 is capable of sufficient movement to allow the hook to enter one of the several of the spaced apertures 77 in the side wall structure of the car for maintaining the racks in stowed position as represented in Fig. 3. To ensure maintenance of the nests of the rack sections 20 and 38 I provide coacting outstruck projections and recesses 78 and 79 as shown in Figs. 9, 11, 18, 34 and 35 in the end plate members of the sections 20 and 38 by which the sections are spring-latched into nested position and prevented from readily falling apart. By applying a reasonable force to the rack 38 it is readily dislodged from rack 30 and swung outwardly to a position substantially coplanar with rack 30 and then moved downwardly to a horizontal position ready to receive the load within the refrigerator car.

The side hinges constituted by bars 68, 69 and 70 properly space the adjacent racks represented for example by 20 and 38, so that rack 38 may be moved to a position nesting with rack 20, that is, from the dotted line position 38′ in Fig. 18 to the full line position 38. As illustrated more clearly in Fig. 21, the hinge formed by bar 68 is spotwelded around an extrusion 89 on stringer 40 securing bar 68 in a position extending in a plane for all practical purposes coplanar with the plane of the stringer 40. The bar 68 is connected with stringer 40 in rack 38 by means of the pin 71 which extends through the extruded bearing 90 outstruck from the stringer 40 of the rack section 38. The extruded bearing 90 extends through an aperture 68a in bar 68. Pin 71 is provided with a confining head 71a on one end and is swaged over on the other end 71b to permit rotation of rack section 38 with respect to rack section 20 and the nesting thereof, as illustrated in Figs. 18 and 20. In Fig. 18 the units 20 and 38 are illustrated in nested relation, as distinguished from the extended relation of these units illustrated in Fig. 20. In Fig. 18 the section 38 is illustrated moved around hinge bars 68, 69 and 70 from dotted line position 38′ to full line position 38, whereas in Fig. 20 rack section 38 is shown in extended relation to rack section 20 and illustrated in full lines preparatory to movement to the dotted line position 38″.

In order to clarify the arrangement of nesting of the rack sections adjacent the door openings of the refrigeration car, I have illustrated the structure in enlarged fragmentary views shown in Figs. 34 and 35, wherein it will be observed that when rack section 20 hinged to the side wall of the transportation unit is raised and secured in position, as shown particularly in Fig. 3, the open door unit 38 may be raised with respect thereto and latched in position by reason of the spring connection between outstruck projections and recesses 78 and 79. Fig. 34 shows in enlarged fragmentary section the manner in which this detachable connection is effected, while Fig. 35 shows in plan view the manner in which the spring interlock is maintained.

Fig. 17 shows in enlarged foreshortened sectional view the relationship of the rack sections to the wall of the refrigeration unit when the rack section is lowered to the position illustrated in Fig. 2. Fig. 17 shows the horizontal position of the rack section as distinguished from the vertical position thereof illustrated in Fig. 16.

The types of hinges employed in connecting the rack sections with the side walls of the transportation unit differ with the location of the rack section with respect to the interior of the refrigeration unit, and have the forms illustrated in Figs. 22–32. In Fig. 22 I have shown the construction of hinge 80 which is employed between the rack sections installed in positions 8—13, 22—27, 15—20 and 29—34. The hinge 80 constitutes a wall leaf unit having an attachment portion 80a which is secured to the side wall of the transportation unit by means of lag screws 81 which are screwed and not driven into the side wall of the transportation unit, as represented more clearly in Fig. 33. The wall leaf unit extends horizontally from the attachment portion 80a and carries pin member 82 extending in opposite directions and constituting pintles to which the rack leaf hinge section shown in Figs. 30–32 is connected. The rack leaf hinge sections illustrated in Figs. 30–32 comprise leaf portions 83 which are secured to the underface of the end channels of the rack sections shown at 57 and 63. The rack leaf hinge section has an enlarged loop portion 84 thereon which encircles the end of pintle 82 but allows sufficient lost motion thereof to permit a slight shifting of the rack in adjusting the rack to the vertical hanging position illustrated in Figs. 14 and 16. This lost motion facilitates the latching of hook 75 through aperture 77.

In Figs. 26–29 I have shown the construction of the hinge installed at each end wall of the refrigeration unit, that is, the end wall leaf at locations adjacent partition 6 and adjacent partition 7 and in the positions on each side of the door openings at 2 and 3. This end wall leaf unit comprises a bracket 85 having an attachment portion 85a which may be secured to the side wall of the transportation unit. The horizontally projecting portion of the end wall leaf carries horizontally extending pin 86 which engages a complementary construction of bracket leaf member of the form illustrated in Figs. 30–32. The application of the rack leaf member shown in Figs. 30–32 and the assembly thereof with the bracket leaf illustrated in Figs. 26–29 will be clear by reference to Figs. 8 and 19. It will be seen that a rack leaf 82 is mounted on the underface of channels 57 and 63 for coaction with different types of bracket leafs. The rack leaf 83 located in line with channel 63 on the right hand end of the rack shown in Fig. 8 coacts with a wall leaf bracket of the type shown in Figs. 26–29, whereas the rack leaf 83 secured to the underface of channel 57 on the left hand side of the rack unit shown in Fig. 8 coacts with pin 82 on one end of the wall leaf bracket of the type illustrated in Figs. 22–25. Thus, the rack sections located in positions 13, 22, 26 and 29 are hingedly connected with the opposite walls of the transportation unit. A similar arrangement is provided for the end rack sections 6, 27, 15 and 34. All of the other rack sections arranged intermediate the side openings 2 and 3 and the end partitions 6 and 7 of the transportation unit are hingedly connected with the interior side walls of the transportation unit through wall leaf brackets of the type shown in Figs. 22–25.

Figs. 36–38 set forth clearly the structural arrangement of the transverse stringers which rigidly brace the racks while maintaining the racks relatively light in weight. The rigidity is secured by virtue of arch shaped flanges 44—49, which extend in a direction opposite to the direction in which integrally connected tongues 50—56 extend in combination with the tapered side members 42 and 43 and the rolled over channel portion 41. The racks are further strengthened by means of a transversely extending bar 87 extending transversely across one end of the longitudinally extending channels 57—63 and the transversely extending channel 88 extending across the opposite ends of the longitudinally extending channels 57—63 constituting the rack section. Thus, very substantial rigidity is imparted to each rack section. The transverse channel 88 has a resilient projecting face thereon extending beyond the ends of the longitudinally disposed channels 57—63. Sufficient springiness and yieldability exist in the face of the channel 88 to enable the channels on the coacting aligned rack sections to substantially wipe each other in the horizontally aligned position illustrated in Fig. 2 for definitely establishing a positive mutual support for the two coacting rack sections and close the central seam through the rows of rack units. Thus, further rigidity is imparted to the rack structure for further facilitating the supporting of the load. It will be observed that the rack sections are permanently connected to the opposite vertical walls of the transportation unit so that theft thereof from the transportation unit is, for all practical purposes, prevented. The channel shaped members 41 constituting the foot supports for the rack units are each arranged in groups transversely to each rack unit with the channels of each group facing in the direction of the hinged connection of that rack unit with the side wall of the transportation unit. That is to say, the groups of channel shaped members at 41 in one rack section all extend in a direction opposite to the direction in which the channels in the group of channel shaped members in the aligned rack section extend. This complementary relation further increases the rigidity of the support provided by the racks in an elevated position over the base structure. The transverse channel 88 also serves as a partial housing for the swingable hook 75 which is swung around the channel 88 in effecting a latch through the aperture 77. In this respect, all of the rack sections are similarly constructed. The difference in the rack sections occurs only with respect to the hinge connections with the side walls of the transportation unit, as heretofore explained. The fact that components of the rack are fabricated from stainless steel ensures the maintenance of the rack in a bright, sanitary condition in the support of perishable food products including meats and vegetables, and enables the rack to be readily washed periodically after use. The racks coact with each other in the movement thereof from stowed positions against the opposite vertical walls of the transportation unit to horizontal positions in coplanar relation.

I have found the structure of my invention highly practical, and while I have illustrated my invention in certain preferred embodiments, I realize that modifications may be made and I intend no limitations upon my invention other than may be imposed by the scope of the appended claims.

What I claim as new and desire to secure by Letters Patent of the United States is as follows:

1. A floor rack installation comprising a pair of foldable and nestable floor racks, one of said floor racks being hingedly supported and the other of said floor racks being hingedly connected with the aforesaid floor rack, said floor racks each including flat surface members thereon and transverse stringers connected therewith, said transverse stringers having the surfaces thereof extending in relatively close overlapping relation when said floor racks are moved into nested relation, and means formed in the surfaces of said transverse stringers and interengageable with each other for maintaining the racks in folded nested relation.

2. A floor rack installation as set forth in claim 1 in which said means are resilient and are yieldable with said transverse stringers.

3. A floor rack installation comprising a pair of foldable and nestable floor racks, one of said floor racks being hingedly supported and the other of said floor racks being hingedly connected with the aforesaid floor rack, said floor racks each including flat surface members thereon and transverse stringers connected therewith, said transverse stringers having the surfaces thereof extending in relatively close overlapping relation when said floor racks are moved into nested relation, the transverse stringer on one of said floor racks having an outstruck projection therein and the overlapping transverse stringer on the coacting folded and nested floor rack having a coacting alignable projection therein, the said projections constituting a spring latch for resiliently maintaining said racks in folded nested relation.

4. A floor rack installation as set forth in claim 3 in which said projections extend in linear directions in said transverse stringers in positions spaced below the flat surface members constituting said floor racks and offset with respect to each other for facilitating the latching of said racks in folded nested relation.

5. A floor rack installation as set forth in claim 4 in which said transverse stringers include an intermediate web portion having a foot formed on one edge thereof and having connections to said flat surface members along the other edge thereof, and wherein the projections are so located in said webs that the projection in one web extends in the opposite direction to the projection of the web in the transverse stringer of the coacting folded and nested rack whereby said projections are resiliently latched for maintaining the racks in folded nested relation.

6. In a transportation unit of the type comprising a base structure and a side wall enclosing structure having aligned side openings therein, a multiplicity of rack sections each constituted by coacting pairs of racks having supporting stringers extending normal to the plane surfaces of said racks with the racks of the said coacting pairs individually hingedly connected with the opposite side walls of the transportation unit with the free ends thereof alignable in substantially coplanar relation in a horizontal position over said base structure, rack sections aligned with the side openings of said transportation unit and having supporting stringers extending normal to the plane surface of said rack sections and individually hingedly connected with one side of the rack that connects at its end with said wall structure adjacent the opening therein, whereby said last mentioned coacting rack sections may fold along an axis substantially in alignment with the side openings through the transportation unit with the supporting stringers overlapping into nested relation for subsequent stowage in a vertical position against the side wall structure of the transportation unit, and outstruck and instruck projections formed in certain of said supporting stringers and alignable to establish interlocking connection for maintaining the racks and rack sections in stowed relation.

References Cited in the file of this patent

UNITED STATES PATENTS

| Number | Name | Date |
|---|---|---|
| 656,462 | Kirby | Aug. 21, 1900 |
| 1,440,476 | Lippincott | Jan. 2, 1923 |
| 1,543,161 | Hull | June 23, 1925 |
| 1,772,720 | Johnson | Aug. 12, 1930 |
| 2,168,595 | Zeidler | Aug. 8, 1939 |
| 2,226,042 | Zane | Dec. 24, 1940 |
| 2,278,354 | Johnston | Mar. 31, 1942 |
| 2,291,472 | Johnston | July 28, 1942 |
| 2,315,202 | Haseltine | Mar. 30, 1943 |
| 2,368,824 | Geddes | Feb. 6, 1945 |